(12) United States Patent
Joeressen

(10) Patent No.: US 7,738,914 B2
(45) Date of Patent: Jun. 15, 2010

(54) METHOD AND DEVICE FOR ADAPTING THE CONFIGURATION OF AN APPLICATION OF A MOBILE TERMINAL TO AN ACCESSIBLE DATA CONNECTION

(75) Inventor: Olaf Joeressen, Meerbusch (DE)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/505,568

(22) PCT Filed: Feb. 26, 2002

(86) PCT No.: PCT/IB02/00556

§ 371 (c)(1),
(2), (4) Date: Feb. 17, 2005

(87) PCT Pub. No.: WO03/073782

PCT Pub. Date: Sep. 4, 2003

(65) Prior Publication Data

US 2005/0148359 A1    Jul. 7, 2005

(51) Int. Cl.
*H04M 1/00* (2006.01)
*H04M 3/00* (2006.01)
*H04B 1/02* (2006.01)

(52) U.S. Cl. ............... 455/552.1; 455/418; 455/452.1

(58) Field of Classification Search ............ 455/101, 455/412–414, 432, 433, 435, 41.2, 414.1, 455/414.2, 414.4, 432.2, 435.2, 452.1, 552.1, 455/445, 550.1, 418
See application file for complete search history.

(56) References Cited

U.S. PATENT DOCUMENTS

| | | | | |
|---|---|---|---|---|
| 5,828,666 A * | 10/1998 | Focsaneanu et al. | ........ | 370/389 |
| 5,991,639 A * | 11/1999 | Rautiola et al. | ............ | 455/445 |
| 6,081,534 A * | 6/2000 | Sipila | ......................... | 370/466 |
| 6,266,342 B1 * | 7/2001 | Stacey et al. | ................. | 370/465 |
| 6,529,486 B1 * | 3/2003 | Barnes et al. | ................ | 370/389 |
| 6,628,938 B1 * | 9/2003 | Rachabathuni et al. | ... | 455/456.3 |
| 6,751,459 B1 * | 6/2004 | Lee et al. | ..................... | 455/445 |
| 6,842,621 B2 * | 1/2005 | Labun et al. | ............. | 455/456.3 |
| 6,850,497 B1 * | 2/2005 | Sigler et al. | .................. | 370/310 |
| 6,954,641 B2 * | 10/2005 | McKenna et al. | ........ | 455/435.1 |
| 6,973,335 B2 * | 12/2005 | Ganton | ........................ | 455/573 |
| 2001/0027104 A1 * | 10/2001 | Hameleers et al. | .......... | 455/445 |

(Continued)

FOREIGN PATENT DOCUMENTS

EP        0848560 A2      6/1998

(Continued)

*Primary Examiner*—Sonny Trinh
(74) *Attorney, Agent, or Firm*—Ware, Fressola, Van Der Sluys & Adolphson LLP

(57) ABSTRACT

There is provided a method for adapting the configuration of at least one application of a mobile terminal device to an accessible data connection, by the steps of obtaining properties of at least one data connection accessible from said mobile terminal device; and adapting the configuration of said application on said terminal device in accordance with said properties. Further, there is provided a mobile terminal device capable of adapting the configuration of applications to an accessible data connection, comprising data exchanging means, capable of accessing at least one data connection; data processing means, capable of running applications; means for obtaining properties of at least one data connection accessible by said data exchanging means; and means for adapting the configurations of at least one application according to said obtained properties.

20 Claims, 2 Drawing Sheets

U.S. PATENT DOCUMENTS

2002/0025832 A1* 2/2002 Durian et al. ............... 455/556
2006/0112414 A1* 5/2006 Ikonen et al. ............... 725/133

FOREIGN PATENT DOCUMENTS

| WO | WO 00/04732 | 1/2000 |
| WO | WO 01/22662 A1 | 3/2001 |
| WO | WO 01/35585 A1 | 5/2001 |
| WO | WO 01/35689 A1 | 5/2001 |
| WO | WO 02/05581 A1 | 1/2002 |
| WO | WO 02/07379 A2 | 1/2002 |

\* cited by examiner

METHOD AND DEVICE FOR ADAPTING THE CONFIGURATION OF AN APPLICATION OF A MOBILE TERMINAL TO AN ACCESSIBLE DATA CONNECTION

CROSS REFERENCE TO RELATED APPLICATIONS

This application is the U.S. National Stage of International Application PCT/IB02/00556 FILED Feb. 26, 2002.

BACKGROUND OF THE INVENTION

The present invention relates to mobile terminal devices having the capability of communicating via different communication connections. The present invention relates to user devices that can access services via more than one data transfer connection, e.g. via UMTS and Bluetooth. It also relates to programs and applications executable in a mobile terminal device with a minimized requirement of user interaction. More specifically the invention relates to a simple method to adapt the settings of applications in a mobile terminal device, according to actually accessible, available or selected communication connections.

Future devices will have the ability to access remote services via multiple interfaces, e.g. via UMTS (when travelling), via a short range wireless connection like a wireless LAN or Bluetooth (when not moving fast), or via a wired connection such as the Ethernet or the like (when stationary).

As such access technologies have significantly different characteristics, users may wish to change the configurations of applications depending on the access technology currently used. As an example, limited bandwidths of UMTS may be suitable for the use with services that require low data rates, while a Bluetooth connection would permit using the same service at much higher data rates and thereby quality. Furthermore, cost might be different depending on the access technology and users do not want to waste money by using cost-ineffective data connections.

As an example, limited data rates of GSM (<50 kbit/s) may be suitable for the use with services that require low data rates, while a Bluetooth connection (>500 kbit/s) would permit the use of the same service at much higher data rate and thereby quality. Furthermore, the cost of accessing a network might be different depending on the access technology (Bluetooth for free, UMTS maybe costly) and it would be beneficial for the user if the device would be configurable taking such differences into account.

The state of the art provides e.g. a "Method and system for increasing the quality of service at or below a threshold cost" of EP 0 848 560 A2 by Siemens Business Communication systems, which relates to the control of the selection of a data transfer connection in accordance with a predetermined threshold cost. In this document the selection of the data transfer connection is executed according to predetermined optimization algorithms, to provide the service with the best transmission quality at a given cost. The document describes an automatic data transmission connection selection, but not a simplification of the access or application parameters of a certain application.

The cited document further describes an automated data transfer channel selection, but does not adapt the configurations of applications of the mobile terminal device, because the selected channel has to provide a predefined quality of service, to be selected. If a channel does not fit the desired quality standard of the application, the channel is not selected, and therefore the characteristics of the application do not need to be adapted.

The state of the art also provides document WO 01/35689 A1 by NOKIA NETWORKS OY relating to a "Data transmission method and Network system" that is capable of selecting a data bearer according to predetermined data bearer selection parameters. This document also does not describe an easy and simple way to set the parameters of certain applications.

Both documents fail to describe the adaptation of application configurations according to the selection of a certain data transfer connection.

If the selectable data connections depend on different transfer modes, with different transfer properties, it is desirable to fit the performances of the transfer channel and an application using that channel, to optimize the overall performance.

BRIEF SUMMARY OF THE INVENTION

The present invention desires to reduce the number of required user input in a mobile terminal device when selecting an appropriate data channel.

The present invention also desires to minimize the cost of a certain service for the user of the terminal device.

The present invention also desires to provide a simplified access to applications.

According to a first aspect of the present invention, there is provided a method for adapting the configuration of an application of a mobile terminal device (MTD) to an accessible data connection. The MTD is capable of multi-mode-, multi-band or multi-interface communication, and the characteristics of a communication link used by the terminal device depend on the actually selected data transmission connection. As the transmission characteristics change, the characteristic settings of applications using the connections have to be changed accordingly, to provide an optimized service. The method is executed by the steps of: obtaining information about at least one accessible data connection (may be after requesting said information), and setting the configuration of at least one application on said terminal device in accordance with the obtained information about said accessible data connection.

The currently accessible data connection can be e.g. an exclusively selected data connection, if the terminal device is capable of operating only one connection at a time. Such terminal devices can e.g. comprise different transceivers for different transmission frequencies and modes, but only one base band processing means to operate the transceivers. If the terminal device is capable of operating simultaneously different transmission connections, there can be more than one currently available data connection operated simultaneously. This is especially useful for cellular phones or communicators to provide a telephone connectivity even when currently operating another data communication or connection. Such a communicator can offer e.g. a gateway option, to connect e.g. a Bluetooth-only device e.g. with the internet. The properties of the data connection can be retrieved directly from the bearer of the data connection. The properties of the data connection can be retrieved from a memory containing the properties of potentially accessible data connections within the mobile terminal device. The accessible data connection can be a data connection currently accessible, or potentially accessible.

According to one embodiment of the invention, application configurations would change seamlessly depending on the used access technology similar to the automatic activation of car profiles when hooking up a phone to a car kit. Thus the user would automatically use services in a way that fits to the actually selected or available connection type. As an example, the resolution of video connections would be changed such that they are optimized to be low cost on a costly medium while performance is optimized when the connection is cheap. Some services might even be used on selected media only. For example downloading big file attachments during email synchronization would happen only when a fast connection is available while a confirmation would be requested on slow or costly access media. The user confirmation can e.g. be initiated by an application intending to use a data connection.

Advantageously, said obtained properties comprise an identification of said data connection. The obtained properties may contain solely an identification of the available data connection, so that the configurations for the applications can be retrieved. The only available property may be the identification (e.g. the name) of said data connection. Said information can be e.g. the name of the available data connection, so that a user can understand intuitively the principles and the operating principle of the method to simplify user interactions to customize the method. Said identification can be e.g. a proprietary code sequence enabling the adaptation of the configuration of the applications in case of a software implementation of the method. So if the device knows e.g. the maximum data transfer rates of different data transfer connections, the device can select appropriate configurations for its applications according only to the name of an available data connection.

Preferably, said information is obtained when a specific data connection is selected. Said information can be obtained by being provided simultaneously with a selection of a certain data transfer connection, or by an automatic information transfer following the selection. The data transmission connection can be selected by a user e.g. by an active selection or following a confirmation request from the terminal device. The transmission connection can be selected automatically e.g. by a selection method according to the state of the art.

Preferably, the said accessible data connection is only potentially accessible. The term potentially accessible data connection is to describe all connections the terminal device is capable of accessing because of its technical design, and connections the device can access or is capable of accessing because e.g. a data connection base station is within range. The term potentially accessible data connection can describe a data connection confirmed by a user, independently of the presence of a respective base station. The expression base station is to describe all kinds of devices the mobile terminal device can establish a data connection with. The potential accessibility of the data connection enables a user e.g. to pre-select a data connection as accessible, even if a respective base station is out of range. So the device or an application on the device can access a selected service when a respective base station is detected by the device or the application. The properties of potentially accessible data connections can be retrieved e.g. from a memory with pre-stored properties of potentially accessible data connections.

Advantageously, said information is obtained by requesting and actively determining a currently accessible data connection. This can be carried out e.g. by an application, or a software, requesting the status of the data transmission connections. The determination can be executed periodically or can be initiated when the device or an application detects a change in an operation mode or in the data transfer connection. The determination can be executed e.g. when the terminal device scans the environment for data connection carriers within range.

Conveniently, the method further comprises a step of determining applications currently active. The determination of currently active applications enables a communication device to adapt only the settings of active applications to the currently available data connection. This reduces the amount of configurations to be adapted during operation. The advantage of the determination of active applications rises with the number of application operable with the device. For a mobile telephone with a Bluetooth and GSM connectivity for example, the number of adaptable applications is low, so the additional step of detecting currently active applications provides only a slight advantage. In the case of personal computers, communicators or communication enabled PDAs (personal digital assistants), the number of applications to be adapted is greater, so that a determination of active applications and a selective adaptation of active applications may be more advantageous.

Preferably, the method further comprises starting an application on a mobile terminal device. This additional step in connection with the other previously mentioned steps enables the device to configure an application when this application is started. With the start of an application the application requests the actually active transmission connections, and can configure itself, or be configured according to said currently active data transfer connection. The application can be configured when it is started and, if already active, a change in the data connections actually available is detected.

Advantageously, the method further comprises a step of detecting a data transfer to be executed by an application. This reduces the number of required adaptations. With the step of detecting a data transfer to be executed, the application can request the currently available data connection only, if a transmission is to be executed. Therefore, only active applications capable of transferring data are configured, if a transmission really is to be executed. With this method, the number of required adaptations may be reduced.

Conveniently, the method further comprises the selecting of an appropriate data connection. This step can executed e.g. by an automatic or user assisted data transfer connection detection and selection algorithm. The selection of an appropriate data transfer connection may comprise a step of requesting a user for confirming a data connection. The data connection selection can be executed by the application e.g. if the mobile terminal device detects two different available (and confirmed) data transfer connections, and the application can select one of them according to predetermined selection algorithms.

The method may even comprise two different selection steps if, e.g. a user confirms or selects two different data transfer connections and the application selects one of them according to e.g. transfer related properties.

It is to be noted that the methods to adapt the configurations of the applications of said mobile terminal device can be combined with methods to select a certain data connection automatically.

According to another aspect of the present invention, a software tool for carrying out the method adapting the configurations of an application of a mobile terminal device to an available data connection is provided. The software tool comprises program code means for performing all of the steps of the preceding description when said program is run on a mobile terminal device.

According to yet another aspect of the invention, a computer program for carrying out the method adapting the configurations of an application of a mobile terminal device to an available data connection is provided. The computer program may comprise program code means stored on a computer readable medium for carrying out the steps of the aforementioned methods when said program product is run on a mobile terminal device.

Preferably the computer program operates in a distributed manner in different parts of the mobile terminal device. Part of the computer program can operate in connection with applications, another part of the computer program can operate, or is operated at an interface part of the mobile device. Therefore, the computer program can comprise different software elements, e.g. with different abilities.

According to another aspect of the invention, a computer program product for carrying out the method adapting the configurations of an application of a mobile terminal device to an available data connection is provided, comprising program code means stored on a computer readable medium for carrying out the methods of the preceding description when said program product is run on a mobile terminal device.

According to another aspect of the present invention a mobile terminal device is provided which is capable of adapting the configurations of applications to an available data connection. The mobile terminal device comprises data exchanging means, capable of generating or accessing a data connection, data processing means, capable of running applications, means for obtaining information about data connections currently accessible, and means for adapting the configurations of applications to available data connections. Said adapting means are preferably connected to said data processing means.

The data exchanging means of the mobile terminal device are capable of establishing at least two different data connections. These connections are exclusively or simultaneously operable.

In a preferred embodiment the mobile terminal device can be capable of operating different data connections simultaneously, wherein a running application can decide by itself which data connection it is going to use. The setting of the configurations of the applications can e.g. be selected according to the currently available connections and an e.g. application specific hierarchic algorithm.

In the simplest embodiment, the information obtaining means and a connection selection means can form a unit with the means for adapting configurations of applications and can be embodied as a single multi circuit breaker. In this simplest embodiment the multi circuit breaker switches the data transfer channel and the applications of the mobile terminal simultaneously, by switching the hardware connections between respective hardware configurations. In this embodiment the means for obtaining information about data connections currently accessible, is e.g. a mechanical connection between the switch for selecting a data transfer connection and the switches controlling the configurations of the applications. In this simplest case, even the applications can be hardware applications.

According to another embodiment of the mobile terminal device, the information obtaining means and the means for adapting configurations can be software applications running on the mobile terminal device. In this case the applications and means can be constituted by software.

Preferably, the mobile terminal device further comprises at least one means to select available data connections. This means can be used to select one of multiple data connections if e.g. the mobile terminal device is within the range of more than one base station providing different data transfer services. So e.g. the user of an automatic selection algorithm may select the best data connection available. This approach may also be used to select one of multiple data connections if e.g. the mobile terminal device is capable of multi-connection operation so that e.g. an application can select a data connection automatically. An application may even select a certain data connection automatically, when the access establishes a data connection (with or without a user confirmation) and configures the configuration server according to the selected data connection.

Advantageously, the mobile terminal device further comprises means to store the configurations of said applications for said different data connections. So the terminal device can retrieve the configurations of applications if the properties of the accessible data connection are retrieved, by retrieving them from a memory within the mobile terminal device. This memory can further include a portion to store the properties of data connections to enable the mobile terminal device to retrieve the properties of a data connection without using the data connection to request the properties from the carrier of the data connection.

In the following, the invention will be described in detail by referring to the enclosed drawings in which:

DETAILED DESCRIPTION OF THE INVENTION

Figure 1:
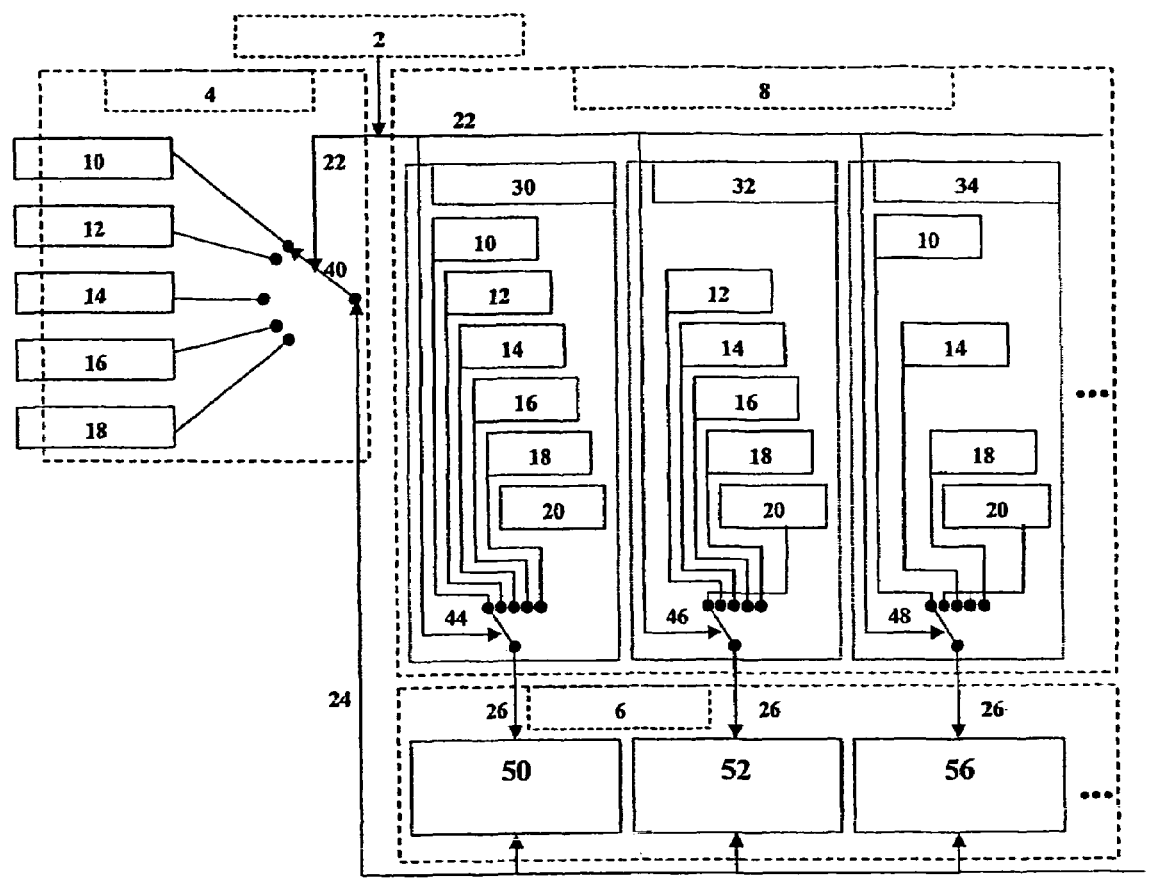
FIG. 1 is a block diagram of a mobile terminal device, according to one embodiment of the present invention.

FIG. 1 depicts a block diagram of a mobile terminal device according to an embodiment of the present invention. The picture shows an architectural view of an embodiment according to the invention. The device is depicted with four subsystems: a media selection system 2, an access subsystem 4, an application system 6, and a configuration server 8. The media selection system 2 can be e.g. a user confirmed or user selected media selection system or an automatic media selection system. The media represents a communication connection or channel e.g. like Ethernet 10, GSM 12 (Global System for Mobile Communication), UMTS 14 (Universal Mobile Telecommunication Service), Bluetooth 16, WLAN 18 (Wireless Local Area Network) or the like. This includes the different sub-standards and transfer protocols used for these wired or wireless communication connections like e.g. GSM/GPRS (General Packet Radio System), /CSD (Circuit Switched Data), /HCSD (High-speed CSD), WAP (Wireless Application Protocol), TCP/IP (Transfer control Protocol/Internet Protocol), and the like. It is to be noted that the device may comprise additional wire or fiber optical connection features, hardware connectivity, and the like. The hardware connections are not explicitly discussed, as the basic features and properties thereof, like data rates, costs, and the like are basically the same.

The access subsystem 4 can establish different data transfer connections, provided that the mobile terminal device is within the range of a respective base station (not shown). In the depicted mobile terminal device, a switch 40 controlled by the media selection system 2 via a control connection 22 selects an access system 10-18 of the access subsystem 4. In the depicted embodiment, the mobile terminal device is only capable of using one of the connections at the time provided by the access subsystem 4 because of the structure of the switch 40. An advanced mobile terminal device may be able to communicate via more than one data transfer channel simultaneously, and therefore may comprise an additional switch or hard- or software elements accordingly. Such a mobile terminal device may provide a multi connectivity or even gateway functionality.

The application system 6 is provided in the mobile terminal device and is capable of operating or running the applications 50-56. The applications 50-56 can be hardware or software applications. For best performance the configuration of the application 50-56 should be adapted to the data connection 10-20 actually available, if one of the applications 50-56 is to transfer data. To provide a fast and simple way to adapt the configurations to the available data connection, the mobile terminal device comprises the configuration server 8. The configuration server 8 stores the application configurations 30-34 for the different available data connections 10-18. So if the device detects an available (and usable) data transfer connection, the configuration server 8 sets the configurations of the applications 50-56 according to the actually available, accessible or selected data transfer connection 10, e.g. Ethernet. Data for applications 50-56 can be transferred to the access subsystem 4 by line 24.

In the case of the application 50, e.g. an e-mail application, the application system 6 sets the switch 44 on a position to provide the configuration 10 for Ethernet to the e-mail application 50.

In case of the e-mail application, the different settings can comprise application settings of the application not directly related to an actual transmission connection. Due to a lower data rate and higher cost of the connection, downloading attachments exceeding a certain size limit might be disabled when GSM 12 or UMTS 14 are the access media, while the full data rate is used in all other cases (default). The configuration server provides the information depending on the selected media to the application. The functionality could be part of the application as well. Application configuration information can be transferred between the application configurations 30-34 and applications 50-56 by line 26.

In the case of the application 52, e.g. a video application, the application system 6 sets the switch 46 on a position to provide a default configuration 20 for Ethernet to the video application 52. The configuration provides on the one hand a transmission according to the preferences of the user, and on the other hand saves the resources of the mobile terminal device.

In the case of an arbitrary application 56, the application system 6 sets the switch 48 on a position to provide the configuration 10 for Ethernet to the arbitrary application 56.

So in a restricted data transfer mode, the user can decide, e.g. if he prefers to watch a video transmission with a lowered frame frequency, or a lowered resolution or the like. For a video application, the configuration of the application can comprise e.g. the reduction of refresh cycles of a display, if a data transfer connection with a reduced frame frequency is detected. The configurations of the application can therefore comprise parameters not directly related to the data transfer process.

In the present embodiment, the configurations available for a single application are stored in the configuration server as application related files 32 to 34. The actual storage format is independent of the depicted file or directory structure.

It should be noted that the configuration can be dependent on other parameters, and can depend e.g. on the presence of e.g. an external power supply, the actual battery conditions or the like.

The media or data transfer connection selected by a user or an application is used as the primary access media. As WLAN/Bluetooth is supported in areas (hot spots), and because of the wireless nature of the transmission system, it is clear, that the access subsystem, the media selection subsystem, the configuration server and/or the applications may comprise the capability of an availability determination. The mobile terminal device can be capable of detecting the availability of data transmission connections, of base stations, and may be able to select the transmission connection automatically or by user confirmation. The mobile terminal device can e.g. sweep the different connections to determine if a base station is within range. Preferably, the mobile terminal device may determine the availability of the transfer connection on the basis of an expected or estimated transfer variables, e.g. a minimum remaining transmission capacity e.g. on the basis of e.g. a prepaid account, a battery capacity, or the like.

It should be noted, that the configurations may be pre-configured for products to minimize user interaction. The pre-configured configuration server entries can be pre-stored on the mobile terminal device, can be varied by the user and/or can be updated by data transmission from a service provider such as the manufacturer or the provider of the data connection.

Figure 2:
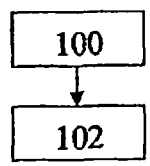
FIG. 2 is a flowchart of a simple application adaptation method according to one embodiment of the present invention.

FIG. 2 depicts a flowchart of an application adaptation method according one embodiment of the present invention. The method is to be used in a mobile terminal device to adapt the configuration of at least one application to a data connection available. The flowchart comprises two main steps 100 and 102. In step 100 the properties of a data connection actually available on said mobile terminal device (MTD) are detected and obtained. In step 102 the configuration of said application on said terminal device is adapted in accordance with said properties obtained.

By changing application profiles/configurations depending on the current (available or selected) access technology (or data transfer connection), users do not have to interact with the underlying technology as much as before. Therefore, the user can use different applications with different data exchange technology faster and easier. As devices that support multiple access technologies are not yet common, the problem has probably not been recognized fully yet.

The first step 100 presumes that a data connection is available. If it is determined that no data connection is actually available, the application configurations may be set to default values in the second step. The process of determining a data connection provider within range, or to detect e.g. a wired connection to other devices, networks, and the like, can be an arbitrary process. The base station or connection detecting algorithms can be arbitrary, and may in the simplest case be performed by user input selecting a transmission connection, and detecting if said transmission connection is actually available. In this simplest case the availability just includes the selection of one connection by a user, and may not include that this connection is actually available (e.g. because of a lack of base stations within the range of the MTD).

It is to be noted, that a step of selecting a data transfer connection can be executed e.g. by an application, in case the access subsystem provides more than one available data transfer connection. In case of two confirmed data connections e.g. the application can select one of the data transfer connections according to (e.g. two) available data connections and e.g. an additional selection step.

In step 102 the MTD adapts the configurations of applications in the MTD, according to the obtained properties of the available data transfer connections. This may be executed by retrieving pre-stored configurations e.g. from a configuration database for each application in the MTD.

The invention aims to simplify the handling of configurations coming from big differences of the media (such as data rates), so it might be useful to apply the same configurations to similar media (e.g. to WLAN and Bluetooth). For example, the definition of a default configuration would be beneficial which defines the most common parameters and is applied if no individual profile exists.

The flowchart depicted in FIG. 2 describes primarily the steps of detecting an available data transfer connection and adapting the applications accordingly. In the simplest case, the MTD is only capable of operating one data transfer connection, and all configurations of all applications are adapted to said one available data connection.

Figure 3:
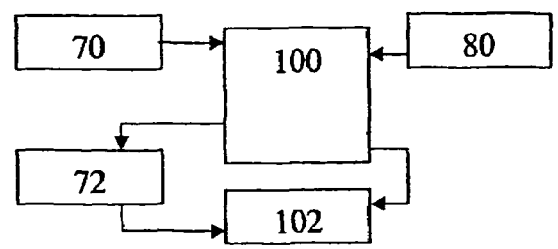
FIG. 3 illustrates a flowchart of an application adaptation method according to another embodiment of the present invention.

The flowchart of FIG. 3 includes the steps 100 and 102 from FIG. 2, and extends the flowchart on one side by the steps 70 and 72, and on the other side by the step 80. Step 70 is a selecting or a determining step if a data transfer connection is available. If the data transfer connection is selected or determined to be available, the active applications on the MTD are detected in step 72 and the configurations of said active applications adapted to the currently available data transfer connection. In the case that e.g. no application is active, no configurations are adapted. The steps 70 and 72 reduce the number of adaptations if, e.g. only a few applications are actually active.

When or if, as in step 80, an application is started, it can be assumed that the application has not been adapted to currently available data transfer connections. Therefore it would be desirable to adapt the applications started later, too. This may be executed by initiating e.g. a request from the started application to adapt its configuration. The method of adapting the configuration of active applications may be executed by periodically executing the method described in FIG. 2 or FIG. 3.

The implementation can be done in SW (software) by providing access technology characteristics and associated user preferences via an access technology configuration server (a piece of SW). Applications would retrieve the configuration information from such a server when they are started or when they perform certain actions (e.g. synchronize email). Additionally, the server could send messages to applications as well as informing them about changing configurations due to changes of the media. The server would provide data on request but could as well issue a change event to running applications in case a profile change happens.

The flowchart depicted in FIG. 3 illustrates basically the same method depicted in FIG. 2 with the difference that only the configurations of active or operating applications are adapted to the characteristics of currently available data connections. Applications started after the selection or the detection of available data transfer connections may not be adapted to the currently available data transfer connection and have to be adapted following their activation. While in FIG. 2 all applications are adapted, in FIG. 3 the adaptation is only executed if an application is active.

Figure 4:
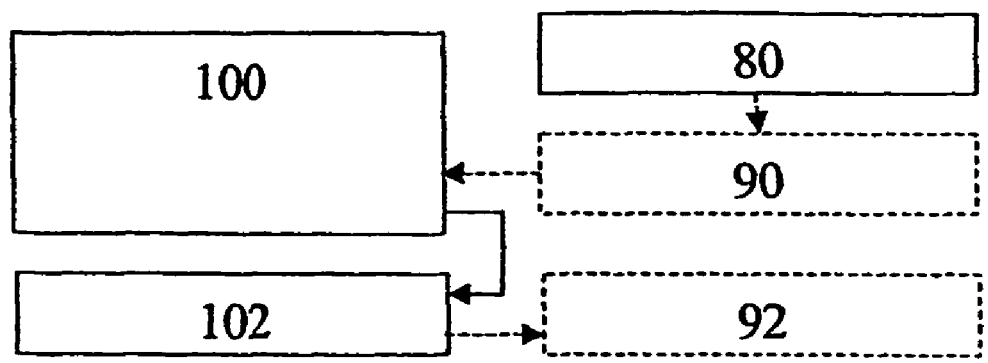
FIG. 4 depicts a flowchart of another method for adapting the configuration of applications according to another embodiment of the present invention.

FIG. 4 depicts a flowchart with a minimized number of adaptations. The adaptation may only be executed if a data transfer to be executed is detected, as in step 90. This may further reduce the number of adaptations to be performed. An application is started in step 80, it keeps running on the MTD until the MTD or the application detects a data transfer to be executed in step 90. This transfer can be an incoming or an outgoing data transfer. Following the detection, the properties of an available data transfer connection is obtained in step 100 and the configuration of the application is adapted accordingly in step 102. This is followed by a data transfer in a step 92. This is the method with the lowest number of adaptations of configurations.

If the obtained properties of the available data connections provide more than one available data connection, the MTD or the application can select one of the available connections e.g. according to a pre-stored algorithm, a pre-stored table or an additional user confirmation.

The flowchart depicted in FIG. 4 illustrates basically the same method as depicted in FIG. 3 with the difference, that the configurations of applications are adapted in dependence of actually required data transfers, and not of actually active applications. While in FIG. 3 all active applications are adapted, in FIG. 4 the adaptation is only executed if a data transfer is actually required.

It should be noted that the MTD may be provided with pre-set numbers of configurations, so that the MTD can provide the features of the invention directly after being sold without the need of further user interaction. The configurations to be retrieved may be updated by using one of the data connections provided by the MTD. The configuration may be provided from a manufacturer or from a data transfer connection provider, such as a internet provider, a mobile communication net provider or the like. The configurations may be downloaded from the internet, WAP, I-Mode Internet or the like. It is to be noted that the user may customize the configurations by user input.

It should also be noted that the expression data transfer channel and data channel is used to describe the different data transfer media such as wired and wireless transfer media such as Ethernet, Twisted Pair, fiber optical, infrared, radio and the like, different data transfer standards such as GSM, UMTS, Bluetooth, WLAN and the like, but also the different data transfer modes within said standards as e.g. GPRS, CSD or HCSD for the GSM Network.

It should further be noted that the MTD can be a mobile telephone, a communicator, a portable computer such as e.g. a laptop, palmtop or tabloid computer, a PDA (Personal Digital Assistant) or the like with multi-connectivity. The term "multi connectivity" is used to describe devices capable of communicating via different communication media.

Lastly, it should be noted that the three methods may be combined, so that e.g. the mobile terminal device can automatically decide which of the three depicted methods is the best to be applied according to parameters such as the total number of active applications, the number of available applications, the number of technically or actually available data transfer connections, or the ratios of said numbers.

This application contains the description of implementations and embodiments of the present invention with the help of examples. It will be appreciated by a person skilled in the art that the present invention is not restricted to details of the embodiments presented above, and that the invention can also be implemented in another form without deviating from the characteristics of the invention. The embodiments presented above should be considered illustrative, but not restricting. Thus the possibilities of implementing and using the invention are only restricted by the enclosed claims. Consequently, various options of implementing the invention as determined by the claims, including equivalent implementations, also belong to the scope of the invention.

The invention clamed is:

1. Method, comprising:
   obtaining at least one property related to at least one of a number of different types of data connections accessible from a mobile terminal device, wherein said at least one data connection can be used by at least one software application of said mobile terminal device; and adapting in said mobile terminal device at least one software application by configuring it in one of pre-configured configurations in accordance with said obtained at least one property of one of said at least one of a number of different types of data connections accessible from said mobile terminal device, wherein said pre-configured configuration relates to a use of said at least one data connection by said software application.

2. Method according to claim 1, wherein an available property comprises the identification of said data connection.

3. Method according to claim 1, wherein said properties are obtained when a specific data connection is selected.

4. Method according to claim 1, wherein said at least one accessible data connection is a potentially accessible data connection.

5. Method according to claim 1, further comprising determining actually accessible data connections, and wherein said properties are obtained during said determination.

6. Method according to claim 1, further comprising determining active software applications, and adapting pre-configured configurations of said determined active software applications.

7. Method according to claim 1, further comprising starting said software application on a mobile terminal device prior to obtaining said properties.

8. Method according to claim 1, further comprising detecting a data transfer to be performed by said software application, prior to obtaining said properties.

9. Method according to claim 1, further comprising selecting an appropriate data connection.

10. Method according to claim 1, wherein:
said adaptation is executed if said application requires to transfer data.

11. Method according to claim 1, further comprising:
adapting said at least one software application by configuring it in one of a number of pre-configured configurations device in accordance with an actual battery condition of said mobile terminal device.

12. A computer readable storage medium having a stored computer program, comprising programming code for:
obtaining at least one property related to at least one of a number of different types of data connections accessible from a mobile terminal device, wherein said at least one data connection can be used by at least one software application of said mobile terminal device; and
adapting in said mobile terminal device said at least one software application by configuring it in one of pre-configured configurations in accordance with said at least one obtained property of one of said at least one of a number of different types of data connections accessible from said mobile terminal device, wherein said pre-configured configuration relates to a use of said at least one data connection by said software application.

13. Apparatus, comprising:
means for accessing at least one data connection of a number of different types of data connections;
means for running at least one software application, wherein said at least one data connection is usable by said at least one software application;
means for obtaining at least one property related to said at least one data connection;
means for storing pre-configured configurations of said at least one software application for said at least one accessible data connection, and
means for adapting in said apparatus said at least one software application by configuring it in one of pre-configured configurations according to said at least one obtained property of one of said at least one data connection, wherein said pre-configured configuration relates to a use of said at least one data connection by said at least one software application.

14. Apparatus according to claim 13, further comprising means for selecting one of said at least one accessible data connections.

15. Apparatus according to claim 13, further comprising means for adapting said at least one software application, if said at least one software application requires transferring data.

16. Apparatus according to claim 13, further comprising means for adapting said at least one software application by configuring it in one of a number of pre- configured configurations device in accordance with an actual battery condition of said mobile terminal device.

17. An apparatus comprising at least one processor and at least one memory storing computer program code, wherein the at least one memory and stored computer program code are configured with the at least one processor, cause the apparatus to at least:
obtain at least one property related to at least one of a number of different types of data connections accessible from said apparatus, wherein said at least one data connection can be used by at least one software application of said apparatus; and
adapt in said apparatus at least one software application configuring it in one of pre-configured configurations in accordance with said obtained at least one property of one of said at least one of a number of different types of data connections accessible from said apparatus, wherein said at least one memory is configured to store pre-configured configuration of said at least one software application for said at least one accessible data connection, and said pre-configured configuration relates to a use of said at least one data connection by said at least one software application.

18. Apparatus according to claim 17, further comprising a selector configured to select one of said at least one accessible data connections.

19. Apparatus according to claim 17, wherein said data processor is configured to execute said adaptation if a data transfer is actually required by said application.

20. Apparatus according to claim 17, wherein said data processor is configured for adapting said at least one software application by configuring it in one of a number of pre-configured configurations device in accordance with an actual battery condition of said mobile terminal device.

* * * * *